(12) United States Patent
Parusel et al.

(10) Patent No.: US 8,968,664 B2
(45) Date of Patent: Mar. 3, 2015

(54) PURIFICATION APPARATUS FOR GASES

(75) Inventors: Franz Josef Parusel, Langenfeld (DE); Berthold Koch, Neuss (DE); Monique Abeels-Koch, legal representative, Neuss (DE)

(73) Assignee: Beko Technologies GmbH, Neuss (DE)

( * ) Notice: Subject to any disclaimer, the term of this patent is extended or adjusted under 35 U.S.C. 154(b) by 1647 days.

(21) Appl. No.: 12/518,014

(22) PCT Filed: Dec. 6, 2007

(86) PCT No.: PCT/EP2007/063475
§ 371 (c)(1),
(2), (4) Date: May 10, 2011

(87) PCT Pub. No.: WO2008/068318
PCT Pub. Date: Jun. 12, 2008

(65) Prior Publication Data
US 2011/0236268 A1 Sep. 29, 2011

(30) Foreign Application Priority Data

Dec. 7, 2006 (DE) .......................... 10 2006 058 082

(51) Int. Cl.
*B01D 53/86* (2006.01)
*B01J 23/889* (2006.01)

(52) U.S. Cl.
CPC .......... *B01D 53/8668* (2013.01); *B01D 53/864* (2013.01); *B01J 23/8892* (2013.01); *B01D 2255/2073* (2013.01); *B01D 2255/20761* (2013.01); *B01D 2257/702* (2013.01); *B01D 2257/708* (2013.01)
USPC .......................................... 422/119; 422/122

(58) Field of Classification Search
USPC ................................................... 422/122, 119
See application file for complete search history.

(56) References Cited

U.S. PATENT DOCUMENTS

| | | |
|---|---|---|
| 4,045,538 A | 8/1977 | Sare et al. |
| 5,114,692 A | 5/1992 | Berty |
| 5,229,071 A | 7/1993 | Meo, III |

FOREIGN PATENT DOCUMENTS

| | | |
|---|---|---|
| FR | 2640889 | 6/1990 |
| WO | WO 9722401 | 6/1997 |
| WO | WO 0025901 | 5/2000 |

OTHER PUBLICATIONS

International Search Report and Written Opinion of the International Searching Authority for International Application No. PCT/EP2007/063475.

*Primary Examiner* — Sean E Conley
(74) *Attorney, Agent, or Firm* — McCarter & English LLC

(57) ABSTRACT

A purification unit for separating hydrocarbons from a gas. The purification unit comprises a converter housing suitable for conducting gases therethrough, with a catalyst material disposed therein, with the catalyst material being heated from the outside of the converter housing by means of a heat source.

15 Claims, 2 Drawing Sheets though, also do not produce pressurized air that does not have at least small contents of, for example, organic contaminations. This is a result of the fact that compressors take up contaminants from the ambient air and that their bearings and shafts must be lubricated, so that they also give off volatile components to the ambient atmosphere.

PURIFICATION APPARATUS FOR GASES

CROSS-REFERENCE TO RELATED APPLICATIONS

This patent application claims priority to co-pending German Patent Application 10 2006 058 082.6, filed Dec. 7, 2006 which is hereby expressly incorporated by reference in its entirety as part of the present disclosure.

BACKGROUND OF THE INVENTION

The present invention relates to a purification unit for separating hydrocarbons from a gas.

When gases are compressed, for example during the production of pressurized air, the compressed gas is almost inevitably contaminated with oil aerosols and oil vapor. Lubricants, oils, anthropogenic substances contained in the air, sulfur dioxide, carbon monoxide and nitrogenous gases, for example, can be introduced into the gas or the pressurized air. These contents can be present in the form of gases, vapors and oil aerosols.

Such contaminations are undesirable or even unacceptable for a multitude of applications.

BRIEF DESCRIPTION OF RELATED ART

At present, no compressors are known that are able to generate oil free pressurized gases, in particular oil-free pressurized air without further treatment. Though there are compressors available which compress the gas or pressurized air free of oil, they, however, also do not produce pressurized air that does not have at least small contents of, for example, organic contaminations. This is a result of the fact that compressors take up contaminants from the ambient air and that their bearings and shafts must be lubricated, so that they also give off volatile components to the ambient atmosphere.

For this reason, downstream filtering units are commonly used which are supposed to ensure the quality of the pressurized air. Absorption filters of active carbon which, however, have a short life, are primarily known.

U.S. Pat. No. 5,284,629 A describes a method for removing compressor oil from pressurized air in which the pressurized air is conducted through a container with a layer consisting of an oxidation catalyst located therein. Metallic components from the group of platinum, palladium, nickel, cobalt, iron, rhodium, manganese and copper are mentioned as catalyst materials.

Furthermore, DE 100 08 609 C1 describes a similar method in which a hopcalite material is used as an oxidation catalyst. Hopcalite is the term for mixed catalysts consisting primarily of manganese dioxide and copper(II) oxide. Additionally, they may contain further metal oxides, for example cobalt oxides and silver(I) oxide.

BRIEF SUMMARY OF THE INVENTION

Hopcalites catalyze the oxidation of toxic carbon monoxide (CO) to relatively harmless carbon dioxide (C02) with (atmospheric) oxygen (02) at room temperature. For this reason, they are used in the filters of gas masks and other breathing apparatus. Moreover, hopcalites catalyze the oxidation of various organic compounds at an increased temperature (200-500° C.). Compositions include, for example 60% $MnO_2$/40% CuO or 50% $MnO_2$/30% CuO/15% CoO and 5% $Ag_2O$.

Although hopcalite catalysts have been used in practical application for decades, many questions with regard to their mechanism of action still remain open. This is due to the complexity of the systems which makes it difficult to obtain information on the active sites and the mechanisms of catalysis and deactivation. In any case, this material is capable of removing or separating oil components and volatile organic compounds from pressurized gases, and is unsusceptible to toxification by phosphorus, sulfur, zinc and other common oil additives. As is also described in DE 100 08 609, the catalyst material is usually heated by means of a heating device in order to reach a desired working or operation temperature. The optimum working temperature is approximately 130 to 150° C.

Purification units comprising a heating rod which is disposed within the container and is in contact with the catalyst material are known. Depending on the configuration, the heating rod can have a length which approximately corresponds to the length of the container and thus extends more or less through the entire catalyst material; however, also such arrangements are known in which heating rods protrude into the catalyst material only to a small extent.

A high-quality purification of the gas requires the entire catalyst material to have substantially the same temperature. Because the catalyst material as a rule has only a very low thermal conductivity, the heating rods mostly have a temperature above the actual operating temperature. This also the case, in particular, with regard to hopcalite. The higher temperature in the area of the heating rod overall leads to a non-uniform temperature distribution within the catalyst material. In turn, this may cause a non-uniform reaction, which is the case especially during the start-up of the purification unit, that is, before the heat can distribute uniformly. Alternatively or in addition to the use of heating rods, heating systems are known which heat up the supplied gas flow prior to entry into the purification unit. However, what is disadvantageous in this case is that the gas flow cools off while flowing through the container and thus has a lower temperature close to the outlet than at the inlet into the container. This may also lead to non-uniform reactions. Because it cools down, the gas flow is overheated as a rule, which additionally causes a relatively high expenditure of energy. This particularly applies when the cold container is started up.

It was also observed that so-called hot-spots having a significantly higher temperature can form close to the heating rods in the area of the gas inlet into the container, even in the case of an upstream heating system. They can reach temperatures which may even cause a self-ignition or inflammation of the oil or catalyst material. Inflammation of the oil occurs at approximately 250 to 300° C. However, the danger of inflammation must be avoided at all costs, which is why temperature sensors are usually provided which switch off the unit in the case of a temperature increase above a certain temperature threshold, or at least trigger an alarm.

Finally, another drawback of known purification units lies in the fact that they are not capable of segregating an above-average amount of hydrocarbons in the gas flow, thus passing it on to downstream units. This can have considerable negative consequences for the downstream units; depending on the use of the purified gases, this may also be to the detriment of humans and animals.

It is the object of the present invention to provide a purification unit with a high efficiency which also meets, in particular, high safety requirements. The purification unit is supposed to be cost-effective with regard to its production and to ensure a continuous operation and a safe separation of hydrocarbons, respectively.

According to the invention, the object is achieved by a purification unit comprising a converter housing suitable for conducting gases therethrough, a catalyst material disposed therein and at least one temperature sensor, wherein the catalyst material is heated from the outside of the converter housing by means of a heat source, wherein the catalyst material contains pure hopcalite which heats up sharply given an increased content of hydrocarbons in the gas, and wherein the temperature of the hopcalite is determined with a temperature sensor.

Heating the catalyst material from the outside through the converter housing has the substantial advantage that a more uniform heat distribution can be achieved. Because of the considerably larger available surface area, the heat energy per unit area required for increasing the temperature to a certain level can be significantly reduced. A particularly advantageous embodiment optionally suggests to wrap the converter housing with a strip heating. In a cylindrical container/the heat input then takes place preferably over the entire lateral surface of the container. The large surface area that can be utilized for heat transfer has the advantage that the probability of a localized temperature increase (hot spots) and thus, the danger of self-ignition or inflammation of the oil is significantly reduced.

Any other suitable heat source or heating system can be used instead of a strip heating; what is essential is that the heat input takes place over the outer surface which is as large as possible. The use of a jacket heating, a heating sleeve or a ring-type heater, among other things, is also conceivable. Preferably, heating from the outside can also be combined with heating within the container. In this case, the power of the heating rod, which for example extends centrally through the container, can be significantly reduced, which in turn reduces the danger of uncontrollable temperature increases.

The use of hopcalite is particularly suitable for the catalyst material. For reasons of cost, the use of pellets of aluminum oxide coated with hopcalite has proved its worth.

In contrast to prevailing opinion, a catalyst material is used according to the invention which in part consists of pure hopcalite. Because the use of pure hopcalite leads to a sharp increase of the reaction temperature within the container in the area of the pure hopcalite material in the case of an increase of hydrocarbon input. This temperature increase can be registered with appropriate temperature sensors in order to prevent the hydrocarbons from being passed on to further units or for further use of the gas, by switching off the purification unit. In case of a malfunction, the temperature increase in the hopcalite thus serves as a signal or trigger for switching of the unit and/or for a clear cutoff of the carrier gas in order to interrupt the combustion process (e.g. due to lack of oxygen). Due to the increased temperature, an alarm signal can be issued or the purification unit can be switched off immediately. When pellets are used which are merely coated, this effect of a sharp temperature increase does not occur due to the smaller amount of hopcalite.

Alternatively, other substances can be admixed to the catalyst material; what is essential is only that they lead to an increase of the reaction temperature within the container in the case of an increase of hydrocarbon input.

Admixing the appropriate material, preferably pure hopcalite, can take place by means of a layered arrangement within the converter housing. What is meant by this is that, in the direction of the flow, a layer of the catalyst material which extends over the entire cross section of the container is formed of pure hopcalite. Alternatively, however, a plurality of these layers can also be provided.

An addition of pure hopcalite to the otherwise impure catalyst material can also make sense. It is also conceivable that a catalyst material that does not comprise hopcalite constituents is mixed with sufficient hopcalite components.

Basically, the sharp temperature increase occurs not only in spherical catalyst material but also in other shapes or configurations of the catalyst material. For example, a porous body is conceivable through which the gas to be purified flows. The concept according to the invention to use hopcalite as an indicator temperature increase can thus basically be realized with any form of catalyst material.

The invention is explained further by means of the following description of the figures. The exemplary embodiment shown therein constitutes only one possible variant for realizing the invention and serves for better comprehension, which is why the invention is not to be limited to this exemplary embodiment.

DETAILED DESCRIPTION OF THE INVENTION

Figure 1:
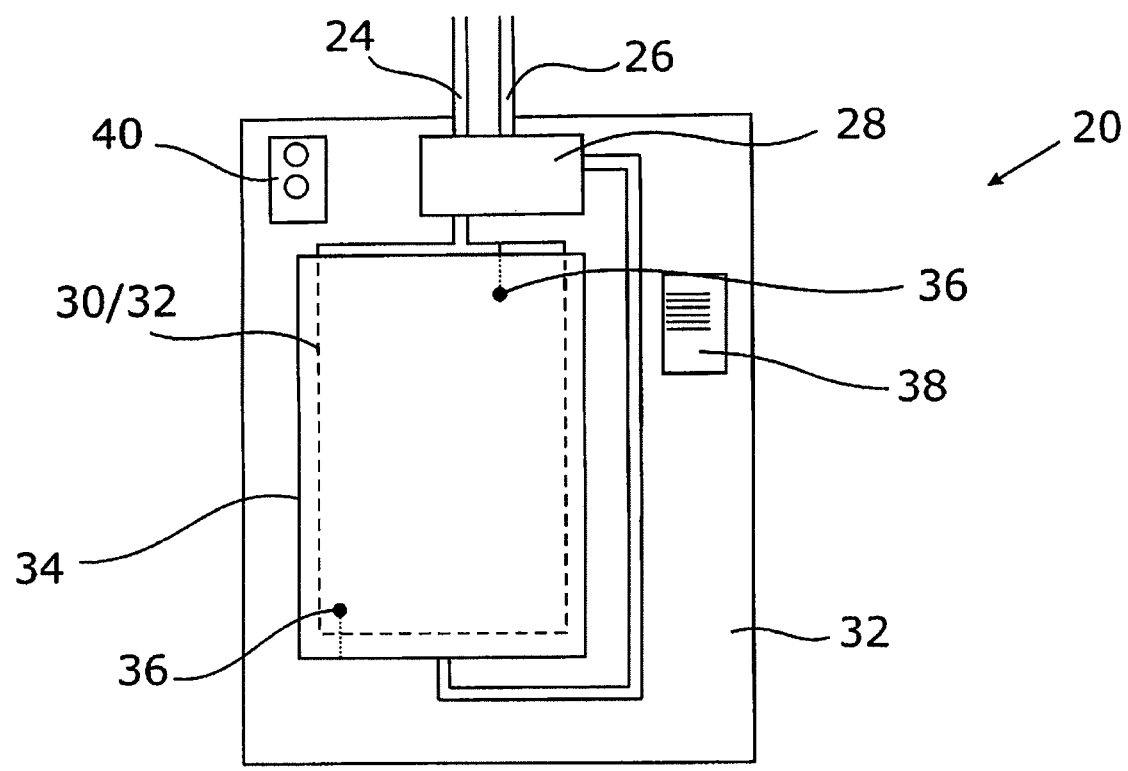
FIG. 1: shows a perspective view of the purification unit according to the invention.
Figure 2:
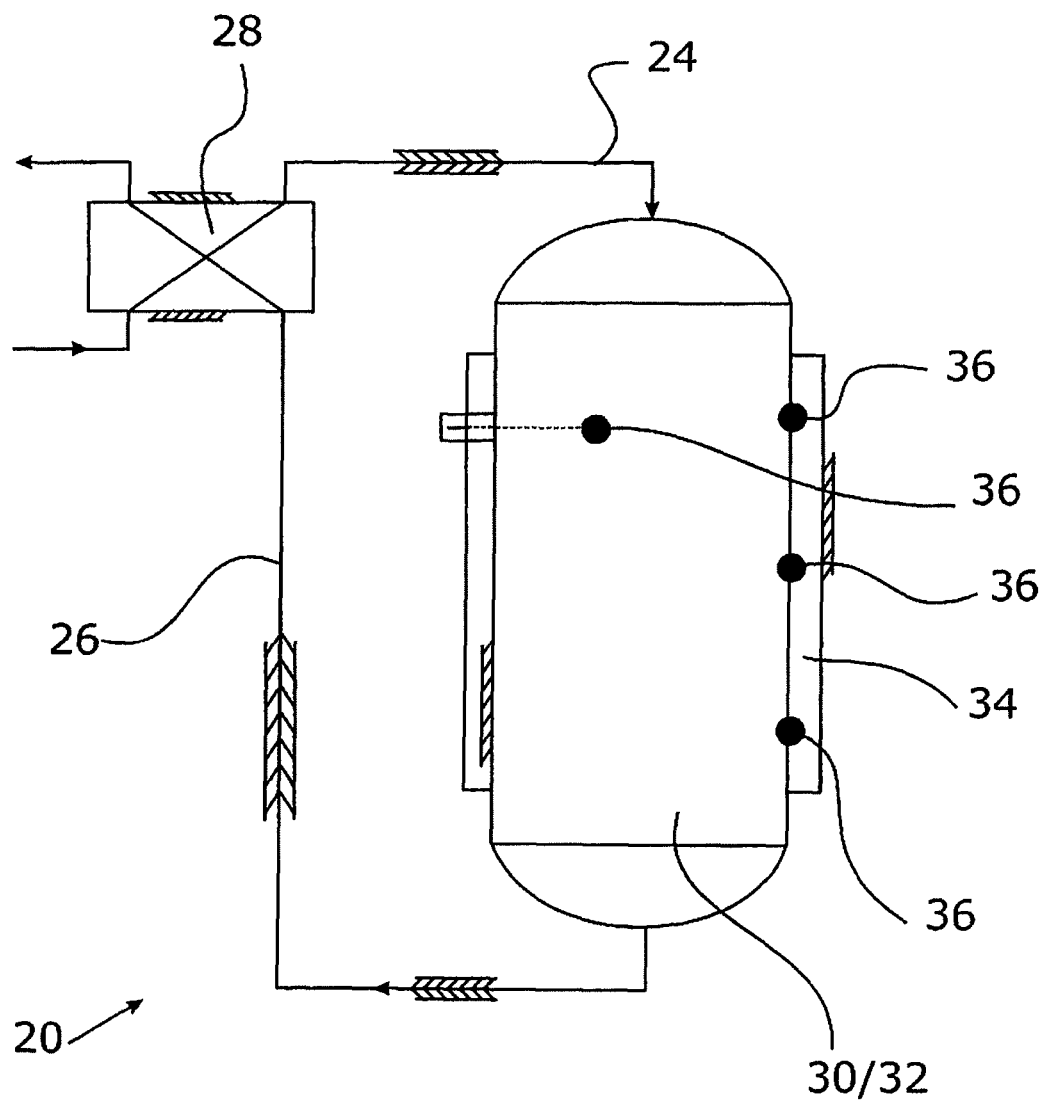
FIG. 2: shows a functional diagram of the purification unit according to the invention.

According to FIGS. 1 and 2, a purification unit 20 according to the invention is usually accommodated in a housing 22. The gas to be purified, preferably pressurized air, is supplied via a supply pipe 24 and discharged via an outlet pipe 26. A purification unit 20 according to the invention is usually installed downstream from compressors (not shown); however, a use as a terminal device directly in the area of use of the purified pressurized air is also possible. The purification unit 20 can be installed and operated downstream from compressors of any constructional type (piston compressors, screw compressors, etc.) provided the respective operating conditions are observed. For high energetic efficiency, heat exchanging systems are used which enable the return of escaping thermal energy. The proportion of energy that is to be supplied additionally is reduced accordingly following an initial heating-up phase.

Thus, the supply pipe 24 first conducts the gas to be purified through a heat exchanger 28, preferably configured as a plate heat exchanger. It then arrives in a converter 30 filled with catalyst material, which is not depicted. In the exemplary embodiment shown, the converter 30 comprises a cylindrical converter housing 32 through which the gas to be purified flows in the longitudinal direction.

Hopcalite, for example, which is preferably used in the form of pellets with a diameter of approximately 1 to 5 mm, can be used as the catalyst material for separating hydrocarbons. However, any other form is also conceivable in principle.

According to the invention, the converter housing 32 and thus the catalyst material is heated from the outside by means of a heat source or heating system 34 until the required operating temperature is reached. In principle, the type of heating system 34 can be chosen freely, however, the use of a strip heating which is wound around the converter housing 32 has proven to be very suitable. Such a strip heating comprises metal strips which are enclosed by a textile or plastic material and heat up when an electric current flows through them. Thus, the generated heat is given off directly to the entire outer surface of the converter housing 32 and then to the catalyst material.

Temperature sensors 36, which are preferably located in the inflow and outflow areas of the converter housing 32, and optionally in the center of the converter housing 32, are provided for monitoring the temperature in the interior of the converter housing (see in particular FIG. 2). Appropriate displays 38 can be provided on the outside of the housing 22 of the purification unit 20 for visualizing the measurement result. If a temperature is reached that is too high, the purification unit 20 can either be switched off immediately, or an alarm signal can be issued.

Furthermore, the purification unit 20 comprises a temperature control unit 40 which is also accessible from the outside and through which the purification unit 20 can be set and controlled.

According to the invention, an enrichment of the catalyst material with pure hopcalite can be provided. Either the converter housing 32 contains layers of pure hopcalite, or the pure hopcalite is admixed to the catalyst material and distributed substantially uniformly in the converter housing 32. If there is an increase in the amount of hydrocarbons, the pure hopcalite leads to a sharp temperature increase which is registered by the temperature sensors 36.

The purification unit according to the invention operates with a catalytic system which was specifically developed and optimized for the total oxidation of hydrocarbons (lubricants, oils, anthropogenic substances contained in the air, among others sulfur dioxide, carbon monoxide, nitrogenous gases) in pressurized gas, in particular pressurized air. The substances contained in the air may be present in the form of gases, vapors and aerosols and are converted in the purification unit into carbon dioxide and water. The oil-charged air entering from the compressor usually has a temperature of approximately 10 degrees above ambient temperature. In the heat exchanger 28, this is pre-heated by the hot air from the converter housing 32 to temperatures of 100 to 130° C. It then flows into the converter housing 32 and there flows through the catalyst material at a set operating temperature of approximately 150° C. In the converter housing, the hydrocarbons contained in the air are then oxidized catalytically by means of atmospheric oxygen. The resulting reaction heat is negligibly small given the hydrocarbon concentration common in pressurized air. The purified pressurized air is subsequently cooled off in the heat exchanger 28 to a temperature of approximately 10 to 15° C. above entry.

The invention is not limited to the exemplary embodiment described but also comprises further embodiments that have the same effects or result directly from the invention.

The invention claimed is:

1. A purification unit for separating hydrocarbons from a gas, comprising:
    a converter housing suitable for conducting gases therethrough;
    a catalyst material disposed therein;
    at least one temperature sensor;
    a heat exchanger; and
    a heat source including a heating system surrounding the converter housing adapted to heat the catalyst material from outside of the converter housing;
    wherein the catalyst material contains pure hopcalite which heats up sharply given an increased content of hydrocarbons in the gas;
    wherein a temperature of the hopcalite is determined with the at least one temperature sensor;
    wherein the purification unit is configured such that the gas is pre-heated in the heat exchanger by hot air from the converter housing to temperatures of 100 to 130° C., and then said pre-heated gas flows into the converter housing and through the catalyst material at a set operating temperature of approximately 150° C.; and
    wherein the purification unit is further configured so that when the at least one temperature sensor detects a temperature that is higher than a threshold temperature, at least one of (i) the purification unit is switched off (ii) an alarm signal is issued; and (iii) flow of the gas is cut off.

2. A purification unit according to claim 1, wherein an inner heat source is additionally disposed in an interior of the converter housing.

3. A purification unit according to claim 1, wherein the inner heat source is formed by a heating rod.

4. A purification unit according to claim 1, wherein the entire an entirety of the catalyst material is formed of pure hopcalite.

5. A purification unit according to claim 1, wherein pellets of aluminum oxide coated with pure hopcalite are used as the catalyst material.

6. A purification unit according to claim 1, wherein the converter housing contains at least one layer of the catalyst material containing pure hopcalite which extends over an entire cross section of an interior of the converter housing.

7. A purification unit according to claim 1, wherein the pure hopcalite has been admixed to the catalyst material.

8. A purification unit according to claim 1, wherein an inner heat source is additionally disposed in an interior of the converter housing.

9. A purification unit according to claim 8, wherein the inner heat source is formed by a heating rod.

10. A purification unit according to claim 1, wherein an entirety of the catalyst material is formed of hopcalite.

11. A purification unit according to claim 1, wherein pellets of aluminum oxide coated with pure hopcalite are used as the catalyst material.

12. A purification unit according to claim 1, wherein the converter housing contains at least one layer of the catalyst material containing pure hopcalite which extends over an entire cross section of an interior of the converter housing.

13. A purification unit according to claim 1, wherein the pure hopcalite has been admixed to the catalyst material.

14. A purification unit according to claim 1, wherein the at least one temperature sensor includes a first temperature sensor located in an inflow area of the converter housing and a second temperature sensor located in an outflow area of the converter housing.

15. A purification unit according to claim 14, wherein the at least one temperature sensor includes a third temperature sensor located in a center of the converter housing.

* * * * *